(12) United States Patent
Pokharel et al.

(10) Patent No.: US 8,995,073 B1
(45) Date of Patent: Mar. 31, 2015

(54) DATA STORAGE MEDIUMS AND DEVICES HAVING BIT PATTERNED MEDIA

(71) Applicant: Seagate Technology LLC, Cupertino, CA (US)

(72) Inventors: Puskal Pokharel, Edina, MN (US); Barmeshwar Vikramaditya, Eden Prairie, MN (US); Rene Johannes Marinus Van De Veerdonk, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/802,968

(22) Filed: Mar. 14, 2013

(51) Int. Cl.
*G11B 5/09* (2006.01)
*G11B 5/74* (2006.01)

(52) U.S. Cl.
CPC ........................................ *G11B 5/746* (2013.01)
USPC ............................................................. 360/48

(58) Field of Classification Search
None
See application file for complete search history.

(56) References Cited

U.S. PATENT DOCUMENTS

| | | | |
|---|---|---|---|
| 4,707,752 A * | 11/1987 | Gyi | 360/98.03 |
| 5,452,163 A * | 9/1995 | Coffey et al. | 360/324 |
| 6,643,082 B1 | 11/2003 | Belser | |
| 6,754,032 B1 | 6/2004 | Szita | |
| 7,324,294 B2 | 1/2008 | Moser | |
| 7,643,234 B2 | 1/2010 | Albrecht | |
| 7,706,092 B2 | 4/2010 | Ling | |
| 7,715,137 B2 | 5/2010 | Albrecht | |
| 7,729,073 B2 | 6/2010 | Yamamoto | |
| 7,740,767 B2 | 6/2010 | Kikitsu | |
| 7,864,470 B2 | 1/2011 | Gao | |
| 7,911,728 B2 | 3/2011 | Albrecht | |
| 7,920,348 B2 | 4/2011 | Kawabe | |
| 7,920,354 B2 | 4/2011 | Pokharel | |
| 7,948,701 B2 | 5/2011 | Albrecht | |
| 7,969,676 B2 * | 6/2011 | Buch et al. | 360/31 |
| 7,978,434 B2 * | 7/2011 | Kimura et al. | 360/135 |
| 8,059,350 B2 | 11/2011 | Albrecht | |
| 8,189,282 B1 | 5/2012 | Albrecht | |
| 8,400,735 B2 * | 3/2013 | Dieny et al. | 360/135 |
| 2002/0167751 A1 * | 11/2002 | Lee et al. | 360/72.1 |
| 2003/0017363 A1 * | 1/2003 | Gurovich et al. | 428/692 |
| 2007/0258161 A1 | 11/2007 | Richter | |
| 2008/0316635 A1 * | 12/2008 | Moon et al. | 360/75 |
| 2009/0296255 A1 * | 12/2009 | Aoyama | 360/51 |
| 2010/0020436 A1 * | 1/2010 | Moribe et al. | 360/77.08 |
| 2010/0067142 A1 * | 3/2010 | Pokharel et al. | 360/77.08 |
| 2010/0067145 A1 * | 3/2010 | Pokharel et al. | 360/135 |

(Continued)

*Primary Examiner* — Peter Vincent Agustin
(74) *Attorney, Agent, or Firm* — Cesari & Reed LLP; Kirk A. Cesari; Christian W. Best (57) ABSTRACT

Apparatuses, devices, and systems are presented with servo and data pattern formation using multi-dot arrays. In one example, an apparatus may comprise a data storage medium including a first patterned array of dots of magnetic material, a second patterned array of dots of magnetic material, and a non-magnetic space located between the first patterned array and second patterned array. In another example, a system may comprise a processor configured to store data to a data storage medium, the data storage medium including a first dot composite including a first patterned array of dots of magnetic material, a second dot composite including a second patterned array of dots of magnetic material, and a non-magnetic space located between the first dot composite and second dot composite. An order in which a dot composite and a non-magnetic space occur may define the value of one bit.

18 Claims, 7 Drawing Sheets

(56) References Cited

U.S. PATENT DOCUMENTS

| | | | |
|---|---|---|---|
| 2010/0073810 A1* | 3/2010 | Ozturk et al. | 360/77.08 |
| 2010/0118428 A1* | 5/2010 | Buch et al. | 360/51 |
| 2010/0238586 A1* | 9/2010 | Suzuki | 360/75 |
| 2012/0063028 A1* | 3/2012 | Sakurai et al. | 360/78.01 |
| 2012/0273999 A1* | 11/2012 | Chauhan et al. | 264/293 |

* cited by examiner

DATA STORAGE MEDIUMS AND DEVICES HAVING BIT PATTERNED MEDIA

BACKGROUND

The present disclosure is generally related to servo and data patterns having bit patterned media, specifically using multi-dot arrays in bit-patterned media (BPM). Bit-patterned media, or patterned magnetic media, can refer to a storage medium, such as a magnetic disc memory, where data is stored by means of an ordered array of discrete magnetic islands, as opposed to a magnetic coating across the surface of the disc.

SUMMARY

In some embodiments, an apparatus may comprise a data storage medium including a first patterned array of dots of magnetic material, a second patterned array of dots of magnetic material, and a non-magnetic space located between the first patterned array and second patterned array. The data storage medium may have servo and data pattern formation using multi-dot arrays.

In other embodiments, a system may comprise a processor configured to store data to a data storage medium, the data storage medium can include a first dot composite having a first patterned array of dots of magnetic material, a second dot composite having a second patterned array of dots of magnetic material, and a non-magnetic space located between the first dot composite and second dot composite. An order in which a dot composite and a non-magnetic space occur may define the value of one bit.

DETAILED DESCRIPTION

In the following detailed description of the embodiments, reference is made to the accompanying drawings which form a part hereof, and in which are shown by way of illustration of specific embodiments. It is to be understood that other embodiments may be utilized and changes may be made without departing from the scope of the present disclosure.

Figure 1:
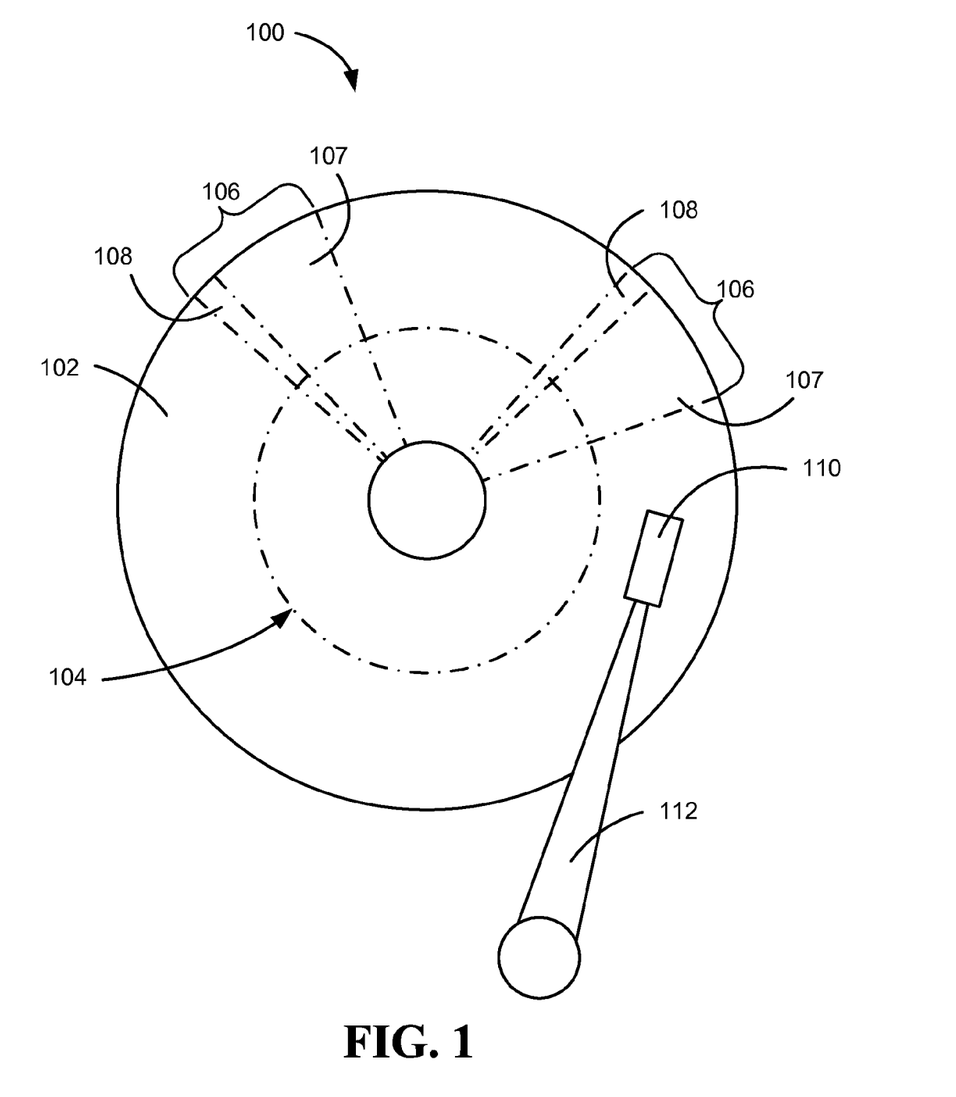
FIG. 1 is a diagram of an illustrative embodiment of a disc data storage medium having servo and data pattern formations using bit patterned media.

FIG. 1 is a diagram of an illustrative embodiment of a disc data storage medium having servo and data pattern formations using bit patterned media, generally designated 100, which may be a magnetic disc or optical disc. A disc data storage medium 102 can be used as a rotatable medium to store digital data and may be divided into a plurality of concentric circular tracks 104 to store the data. The tracks 104 may also be arranged on the disc 102 in a non-concentric pattern, such as in a spiral pattern. The disc 102 may be further divided into a plurality of wedge-shaped sectors 106. Each sector 106 may be further divided into a data area 107 and a servo area 108, so that each track 104 is divided into a plurality of servo fields and data fields based on the disc sectors 106. The data area 107 may be used to store various kinds of data, such as system data or user data. Information stored in the servo area 108 can be used to manipulate an arm 112 having a read and write heads 110 over the disc 102, allowing for the proper positioning of the head over tracks 104 to read or write data. For simplicity the head 110 is displayed as a single component; however, the head 110 may have separate components for reading data and recording data. During operation, as the disc 102 spins, the head 110 can read the servo data 108 and use such data to move the arm 112 to position the head 110 over specific tracks 104. The data storage device may then read or write data to the disc 102 via the head 110.

Figure 2:
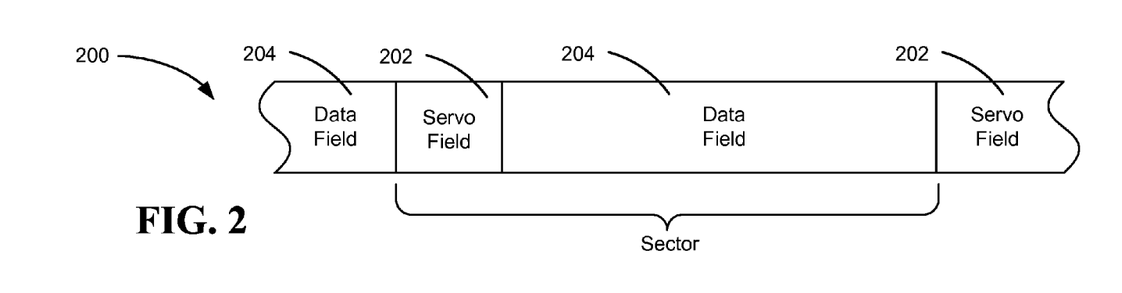
FIG. 2 is a diagram of an illustrative embodiment of data organization on a track of a disc data storage medium having servo and data pattern formations using bit patterned media.

To further illustrate, FIG. 2 is a diagram of an illustrative embodiment of data organization on a track of a disc data storage medium having servo and data pattern formations using bit patterned media, generally designated 200, and depicts a representative sample of a portion of a track of a disc storage medium. The track 200 is divided into a plurality of servo fields 202 and data fields 204. As described above, data stored in each servo field 202 can be used to center a head over the track 200 for reading and writing. Data in the servo field 202 may also provide identifying information such as track ID and sector ID, which facilitates locating specific data. For example, the sector data may identify which track and sector the head is currently over, and when the head is located over the appropriate track and sector it may read data from or write data to the data field 204.

Figure 3A:
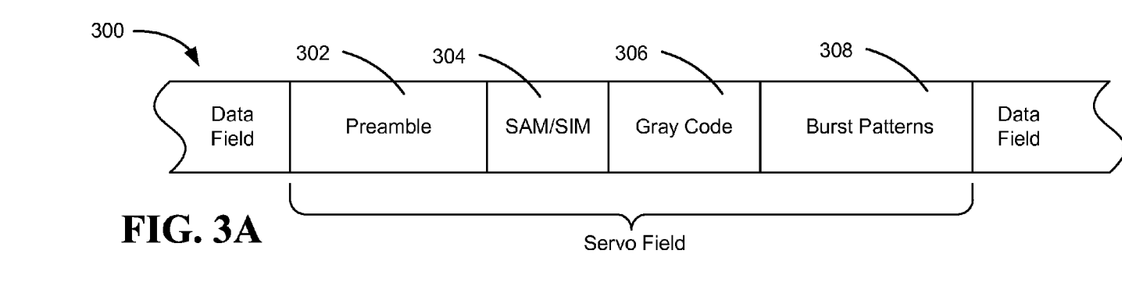
FIG. 3A is a diagram of an illustrative embodiment of a servo field of a track of a disc data storage medium having servo and data pattern formations using bit patterned media.

Turning now to FIG. 3A, a diagram of an illustrative embodiment of a servo field of a track of a disc data storage medium having servo and data pattern formations using bit patterned media is shown and generally designated 300. As shown in FIG. 3A, each servo sector 300 may include a preamble 302, a servo address mark (SAM) and servo index mark (SIM) field 304, a gray code field 306, and a burst patterns field 308. The preamble 302 is configured to provide clock synchronization when reading servo information, and to provide a gap in front of a servo sector for indicating the beginning of the servo sector. The servo address mark (SAM) 304 is a signal that indicates the start of a sector, and the servo index mark (SIM) is a signal that indicates a start of a first servo sector in a track. The SAM 304 may also provide synchronization for reading the subsequent gray code 306. That is, the SAM 304 serves as a reference point for generating each type of timing pulses associated with demodulation. The gray code 306 provides information on each track 104, i.e., track information. The burst patterns field 308 is used to control the head 110 to follow the trajectory on the track 104.

Figure 3B:
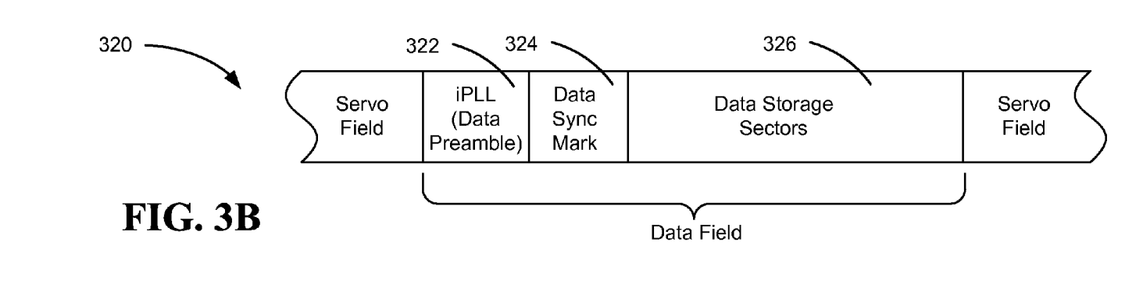
FIG. 3B is a diagram of an illustrative embodiment of a data field of a track of a disc data storage medium having servo and data pattern formations using bit patterned media.

FIG. 3B is a diagram of an illustrative embodiment of a data field of a track of a disc data storage medium having servo and data pattern formations using bit patterned media, such as a sample embodiment of the data field 204 of FIG. 2, generally designated 320. The data field 320 may include a data preamble field 322, sometimes called an interspersed phase-locked loop (iPLL) field. The iPLL field 322 may be evenly placed along the revolution of a track; i.e. circumferentially equidistant from each other. The iPLL field 322 can be used for timing recovery for the data field, such as for reading from or writing to the data storage sectors 326. Similarly, the data field 320 may include a data sync mark field 324, or index mark field, providing a sync mark for the data field similar to how the SAM/SIM field 304 provides a sync mark for the servo field. The iPLL field 322 and the data sync mark field 324 may be located after a servo field and before the data storage sectors 326 of the data field.

In order to improve data storage density on magnetic disc media, a disc may be implemented as bit-patterned media (BPM). Bit-patterned media, or patterned magnetic media, can refer to a storage medium, such as a magnetic disc memory, where data is stored by means of an ordered array of discrete magnetic islands or "dots," as opposed to a magnetic coating across the surface of the disc. Various methods may be used to form patterned arrays of magnetic islands, such as discussed in U.S. Pat. No. 8,147,995 and U.S. Pat. No. 7,041,394, incorporated herein by reference. For example, the discrete magnetic islands may be formed using self-assembly ferromagnetic materials that uniformly order themselves due to their inherent properties. For example, some molecules may self-assemble into seven discrete magnetic islands in a hexagonal pattern, such that a single magnetic island positions at each vertex of a hexagon, with another island in the center of the hexagon. These materials can be used to create a pattern of evenly-spaced magnetic islands, and each magnetic island can hold a stable magnetic charge for storing data. This may improve data storage density, such as by storing a single bit of data in each magnetic dot.

Figure 4:
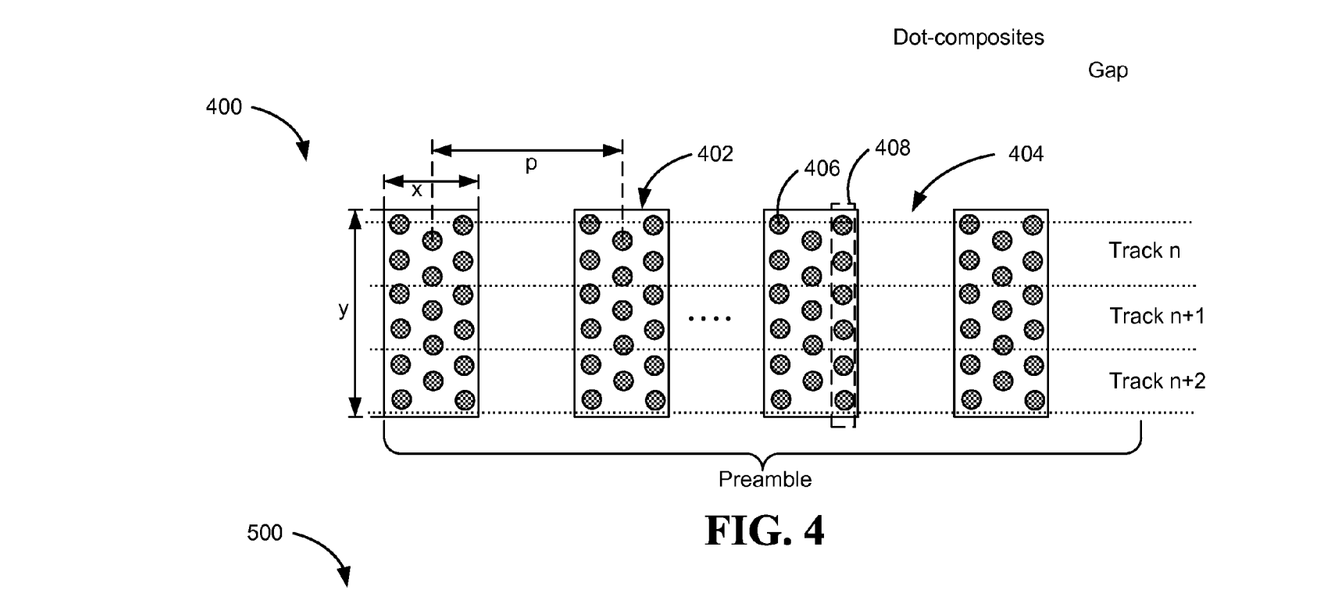
FIG. 4 is a diagram of an illustrative embodiment of dot composite formations of a disc data storage medium having servo and data pattern formations using bit patterned media.

FIG. 4 is a diagram of an illustrative embodiment of dot composite formations of a disc data storage medium having servo and data pattern formations using bit patterned media, generally designated 400. The embodiment 400 can cover a portion of a preamble servo data area for a set of three tracks, track n through track n+2. In the embodiments depicted herein, the patterns are the same across multiple tracks, but in some embodiments different tracks may have different patterns. The depicted portion of the preamble of FIG. 4 comprises a number of dot composites 402 interspersed with non-magnetic gaps 404. Each gap 404 may comprise a non-magnetic space having a width greater than a width of one of the magnetic dots 406.

Each dot composite 402 may include a number of magnetic islands or "dots" 406, which may be comprised of self-assembly materials which arrange into a geometric pattern, such as the hexagonal pattern depicted. In other embodiments, patterns may be triangular or of another geometric pattern. In some embodiments, a dot composite may comprise a radial stripe of multiple rows of dots 408. In the depicted embodiment, each dot composite 402 comprises three rows of dots 408.

Each dot composite 402 may comprise a two-dimensional array having an x-dimension size and a y-dimension size. For example, each array may have a width of x in the downtrack direction, and a length of y in the radial direction relative to the center of the disc. Unless otherwise noted for all illustrations presented herein, the horizontal axis is the down-track direction (direction of the relative head movement over the media) and the vertical axis is the crosstrack (radial) direction.

While each dot of patterned media may be capable of storing a distinct charge, for example so that each dot may store an individual bit, reliability and quality of these pattern formations may be enhanced when multiple rows of magnetic dots are allowed to form in predefined interval bands defined by a guiding pattern. For example, a bit may be represented as a combination of a dot composite and a gap, such that the order in which a dot composite and a non-magnetic space occur defines the value of one bit. Having multiple rows of dots per bit period as described below can improve the consistency of the dot locations during the fabrication process, which improves the pattern quality.

Figure 5:
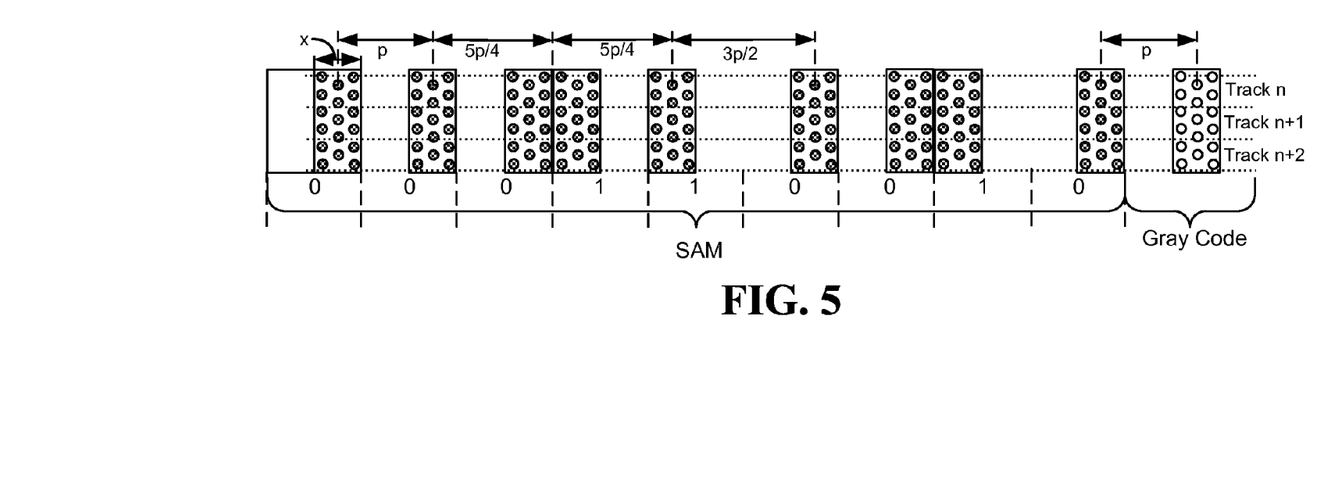
FIG. 5 is a diagram of an illustrative embodiment of dot composite formations of a disc data storage medium having servo and data pattern formations using bit patterned media.

As further illustration, FIG. 5 depicts a diagram of an illustrative embodiment of dot composite formations of a disc data storage medium having servo and data pattern formations using bit patterned media generally designated 500. In the example embodiment 500, a "0" value bit may be encoded as a space followed by a dot composite, while a "1" value bit may be encoded as a dot composite followed by a gap. In some embodiments, other combinations or orders of dot composites and gaps may be used to represent values. A preamble cycle may be one dot composite and one gap, and in some embodiments it may be desirable for the duty cycle to be close to 50%. Therefore it may be beneficial to have the width of a dot composite and the width of a non-magnetic gap to be approximately equal.

Returning to FIG. 4, a preamble pattern for frequency and phase acquisition can be a periodic pattern defined as all '1's with the pattern consisting of alternating dot-composites and gaps, as shown in the example 400. Here p may represent the period of the pattern which may be directly related to the fundamental frequency of the readback signal generated by the pattern, and x may represent the width of the trench or band of the guiding pattern where the dots are self-assembled. x may be defined based on known or assumed process variability with enough margin so that a desired number of rows of dots may form the two dimension array. Process variability may refer to variability in the location and size of the dots from an ideal size and location. For example, with a high variability in the location of the dots, x can be increased in size to ensure that a desired number of rows of dots still form reliability. The example depicted in FIG. 4 includes three rows of dots per dot composite. In some embodiments, dot composites may comprise different amounts of rows of dots.

An odd number of rows of dots 408 may result in the least amount of phase and amplitude variation. For phase variation, an odd number of rows of dots arranged in this manner, each cross-track (vertical) odd-row dot composites is symmetric about the vertical line at the center of each dot composite, for each cross-track location. This can mean that the phase of the readback signal under ideal conditions (e.g. symmetric reader response, etc.), would be constant at each cross track location. For amplitude variation, appropriate choice of reader dimensions along with an odd-numbered dot row pattern can provide lower amplitude variation.

With the encoding scheme defined above where a dot composite followed by a gap encodes a '1' and a gap followed by a dot composite encodes a '0,' any combination of binary data field may be patterned in. For example, FIG. 5 shows an example servo SAM field defined by the bit stream '000110010'. When there is a transition from '0' to '1' in FIG. 5, two dot-composites are shown adjoining but separate to clarify the encoding, but in some embodiments the two adjacent dot composites can be designed such that a single wider dot composite is formed at the same overall center location following the desired number of rows of dots per dot composite. Such a case is shown in FIG. 6 for an encoding of 00010100'.

Figure 6:
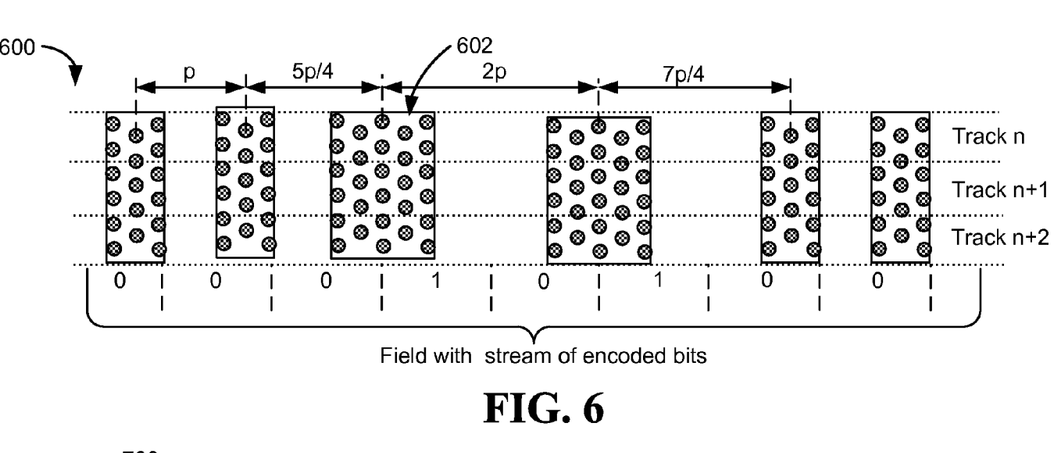
FIG. 6 is another diagram of an illustrative embodiment of dot composite formations of a disc data storage medium having servo and data pattern formations using bit patterned media.

FIG. 6 is another diagram of an illustrative embodiment of dot composite formations of a disc data storage medium having servo and data pattern formations using bit patterned media, and more specifically depicts an example stream of encoded bits using dot composites and non-magnetic gaps, generally designated 600. In the example of FIG. 6, when there is a transition from a "0" to a "1", rather than having two distinct adjacent dot composites of three rows of dots each as shown in FIG. 5, a single wider dot composite 602 with five rows of dots is depicted.

The merging of two dot composites may result in a slight difference in period length, but not significant enough to cause read errors. As discussed above, the single wider dot composite 602 of FIG. 6 has the same overall center location as the two adjacent dot composites of FIG. 5. As depicted in FIG. 5, the period between the center of two dot composites separated by a gap is p, while the distance between the center of a dot composite and the farther edge of the next dot composite following a gap is 5p/4. As depicted in FIG. 6, the period between the center of a dot composite and the center of the wider dot composite 602 is also 5p/4, providing the same period as in FIG. 5.

The number of vertical rows of dots aligned in the radial or cross track direction (for example, three rows of dots in a single dot composite or five rows of dots in combined wider dot composite in the depicted embodiments) may be chosen based on a number of factors or considerations.

One consideration may be pattern quality. The process may result in more reliable and better quality patterns when the number of rows is larger, resulting in a more consistent pattern of self-assembled dots. So for example, using three or more rows of dots per dot-composite may be more preferable than the just one in terms of pattern quality.

Other considerations may include signal processing considerations. Using an odd number of rows of dots per dot composite can provide smaller crosstrack phase variation than an even number of dots. So using three or five rows of dots may be preferable to using two or four rows.

Yet another consideration may be pattern frequency. The pattern frequency can be defined by various system level constraints. For example, the relationship to features in patterns in other fields (data bit period in the data field, cross-track phase slope in the burst pattern, etc,) can also affect the pattern frequency. As a specific example, the period within the interspersed phase-locked loop (iPLL) fields (see below) may be constrained to a fixed multiple of the downtrack data dot center-to-center spacing; typically using 8×, but 12×, 16×, and other periods are possible. Another possible consideration is duty cycle. It may be desirable to keep the duty cycle near 50% as much as possible to reduce the related distortions. Frequency and duty cycle together may define how wide the dot composites are in the down track direction and how many number rows of dots are in each dot composite.

Figure 7:
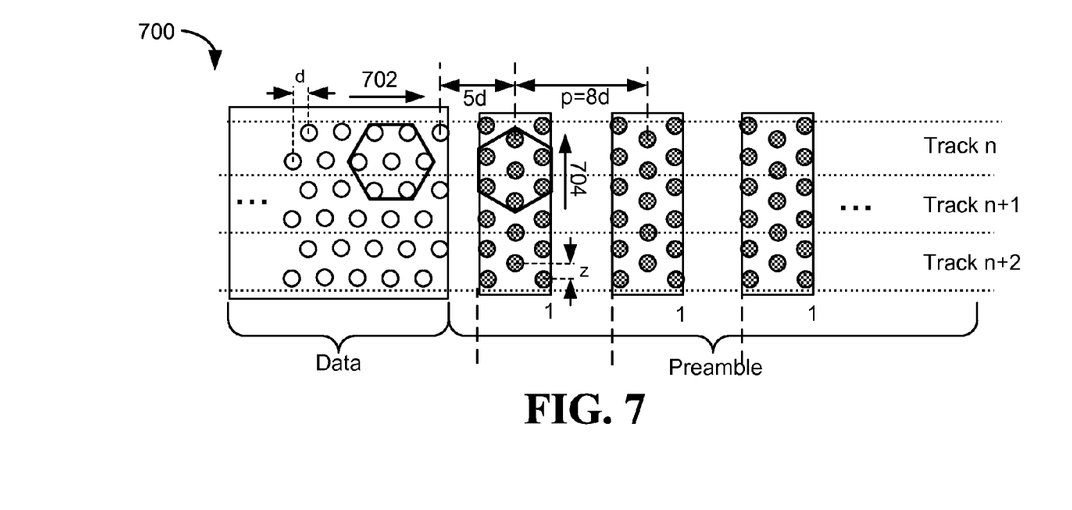
FIG. 7 is another diagram of an illustrative embodiment of dot composite formations of a disc data storage medium having servo and data pattern formations using bit patterned media.

Turning now to FIG. 7, another diagram of an illustrative embodiment of dot composite formations of a disc data storage medium having servo and data pattern formations using bit patterned media is shown. More specifically, an example portion of a data field and a preamble servo field are depicted and generally designated 700. FIG. 7 depicts an example orientation of the patterned dots in fields of a BPM. In the depicted embodiment, the orientation of the dot pattern of the dot composites (e.g., hexagonal arrangement) in the defined patterned fields (e.g. servo preamble, SAM/SIM, graycode, iPLL, and data sync fields) is such that the direction of smallest distance "z" between adjacent dots is parallel to the cross track direction 704. To phrase it another way, the defined patterned fields may have dots of magnetic material arranged in vertical or cross track rows, with the dots of magnetic material in a first row offset (e.g. by distance "z") in a cross track direction 704 from the dots of magnetic material in an adjacent row. In this arrangement the coverage of the number of dots by the reader, and hence the effective reader response, is more uniform in the cross track direction 704, and therefore the phase variation and amplitude variation are reduced. That is, dot patterns resulting in the least cross track phase variation and amplitude variation in the defined pattern fields may be beneficial.

The orientation of the pattern of the data region, on the other hand, may be such that the direction of smallest distance "d" between adjacent dots is parallel to the circumferential or down track direction 702. This orientation may create rows of dots in the down track direction, as opposed to the cross track direction of the dot rows of the preamble fields shown in the figures. To phrase it another way, the data region fields may have dots of magnetic material arranged in horizontal or down track rows, with the dots of magnetic material in a first row offset (e.g. by distance "d") in a down track direction 702 from the dots of magnetic material in an adjacent row. The down track-oriented dot rows can make it possible to read from and write to the consecutive dots one dot at a time as the head moves down the track.

The orientation and location of the dot patterns on a disc may be controlled by "masks," including guiding patterns of trenches and lands. When there are relatively narrow trenches, such as for the servo patterns (defined by the guiding patterns, and represented in the figures by the rectangles of the dot composites), the dots can orient themselves such that the rows of dots are parallel to the edges of the trenches. The process may also involve using lower density dot patterns which can act as weak anchors, and which can multiply and self-assemble through chemical processes as part of the final mask template defining the orientation of the dots. Example processes that can be used to fabricate the media described herein can be found in U.S. patent application Ser. No. 13/363,039, filed on Jan. 31, 2012 and incorporated herein by reference in its entirety.

The arrangement of other elements of the BPM may be based on these distances (e.g. p and z), as will be discussed in greater detail below. For example, the distance between the center of the last row of dots in a data field and the center of the first dot composite in the preamble of the servo field may be 5p, while the distance between the centers of two consecutive dot composites of the same bit type may be 8p, as shown in FIG. 7.

The data phase-locked loop (PLL) fields, also called interspersed PLL (iPLL) fields, may be patterned evenly throughout the revolution of the disc and equally spaced from one-another. These fields can be used as timing recovery fields to get timing information to read and write data in the data fields. These fields may be present prior to a sector of a data field and can be used for phase and frequency acquisition, to ensure proper synchrony during reading and writing over the dots that are separated from each other with non-magnetic material in the predefined hexagonal pattern. Thus the iPLL field may be patterned such that its frequency and phase with respect to the data pattern are well defined, as discussed above.

Figure 8:
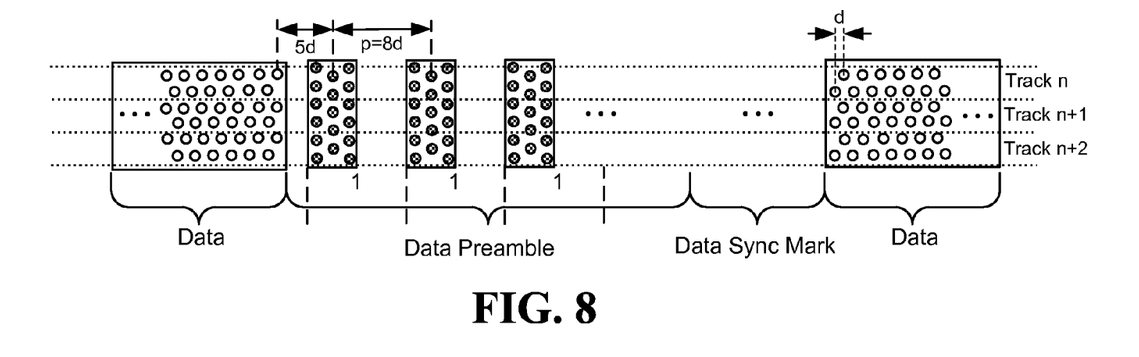
FIG. 8 is another diagram of an illustrative embodiment of dot composite formations of a disc data storage medium having servo and data pattern formations using bit patterned media.

For example, FIG. 8 is another diagram of an illustrative embodiment of dot composite formations of a disc data storage medium having servo and data pattern formations using bit patterned media. More specifically, FIG. 8 shows an example embodiment of the iPLL or preamble field such that it is 1/8th the downtrack data dot frequency (that is, the frequency of dot composites may be such that one dot composite is located in the same distance as eight dots in the data field). Other possible ratios are 1/12th or 1/16th, each of which allows for at least three dot rows per dot-composite and are compatible with practical limitations for the guiding pattern lithography at higher areal densities. For example, sampling the corresponding readback signal at 8 (or 12, 16, etc.), samples per pattern cycle (one pattern cycle is a dot composite followed by a gap) with zero phase error (sampling exactly at the center of the half-cycle corresponding to the dot-composites) would have the system also sample at the center of the dots in the data field. As discussed above and depicted in FIG. 8, p may be the pattern period and d may be the center-to-center dot separation in the downtrack direction of the data field. The preamble and data fields may also be such that there is a known offset between them so that it can be compensated for during read or write, as the 5d offset shown in FIG. 8.

Figure 9:
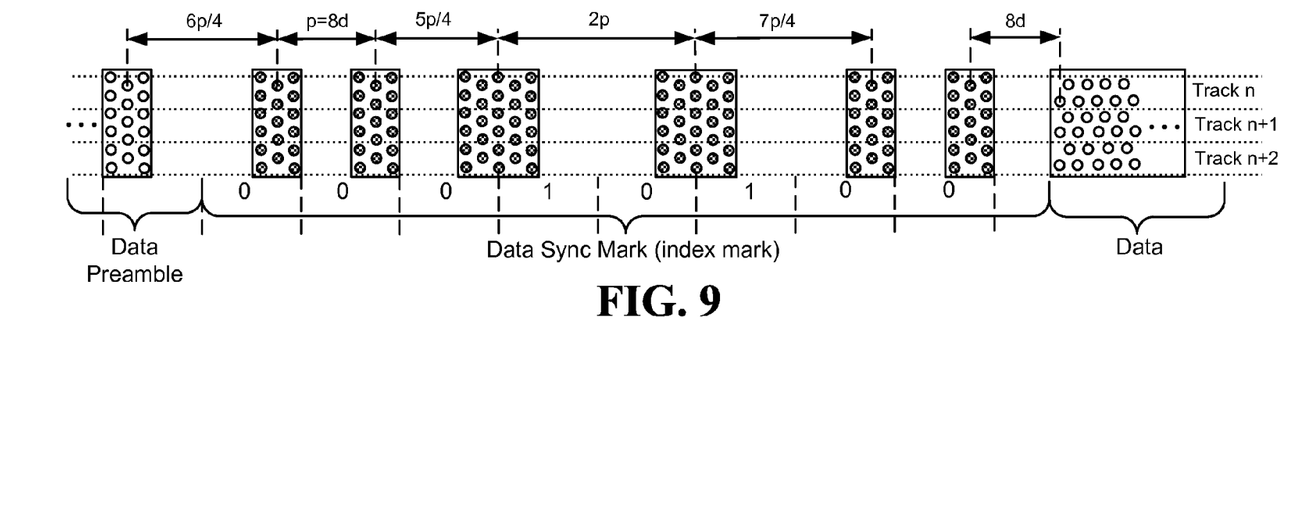
FIG. 9 is another diagram of an illustrative embodiment of dot composite formations of a disc data storage medium having servo and data pattern formations using bit patterned media.

Turning now to FIG. 9, another diagram of an illustrative embodiment of dot composite formations of a disc data storage medium having servo and data pattern formations using bit patterned media is shown. In FIG. 9, the data sync mark field continues after the iPLL or data preamble field as a sequence of bits encoded as defined earlier, and is synchronous to the preamble. FIG. 9 shows a data sync mark field with a data field. A servo field (not depicted) may also be included in the sector, and may also be synchronous to the data preamble and data sync mark fields with the same encoding scheme. The servo fields may not be constrained by the dot frequency considerations of the data fields (e.g. the iPLL and data sync mark fields), since the servo fields may not provide the downtrack timing information fror reading from and writing to the dots.

Figure 10:
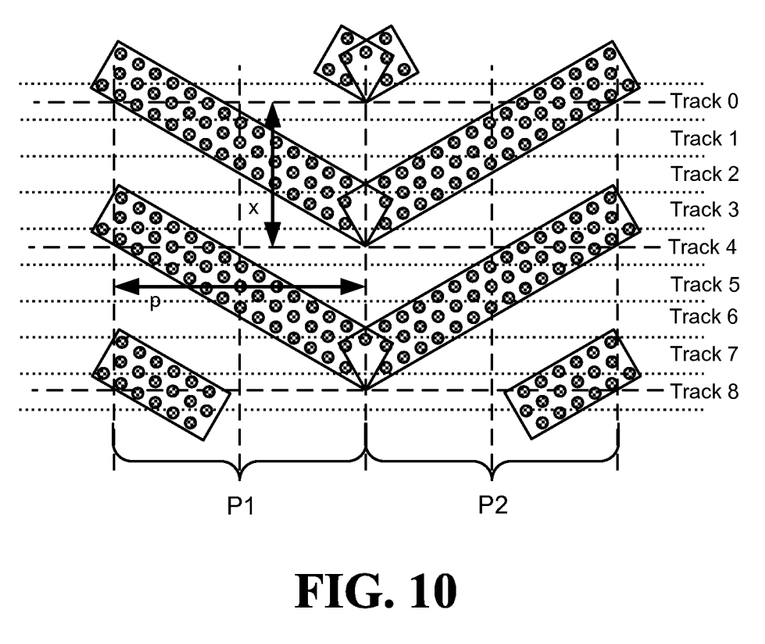
FIG. 10 is another diagram of an illustrative embodiment of dot composite formations of a disc data storage medium having servo and data pattern formations using bit patterned media.

A burst pattern field may follow the other servo fields. FIG. 10 depicts another diagram of an illustrative embodiment of dot composite formations of a disc data storage medium having servo and data pattern formations using bit patterned media, and more specifically depicts a diagram of an illustrative embodiment of a phase encoded burst pattern field. Burst patterns may be phase-based or amplitude-based.

The burst pattern field may take a different format than the radially-aligned stripes of dot composites and non-magnetic gaps described elsewhere in the specification. Since the orientation of the dot composite is defined by the predefined guiding pattern, the phase burst patterns can also be implemented with multiple rows of dots per dot-composite, with the dot composite potentially aligned in non-radial stripes. The dot composites, as used in the burst pattern fields, may be called "servo bursts." The design of the phase burst patterns may be determined by choosing the intended crosstrack period (x) and downtrack period (p) of the pattern, as shown in FIG. 10. The down track period may have a well-defined relationship with the data preamble period (e.g., phase burst period p can be defined as twice the data preamble period) and the crosstrack period defines the relationship between the phase offset of the burst signal and the fine crosstrack position.

One can also construct burst patterns with multiple such sections, usually with some phase relationship between them, to help improve PES accuracy. FIG. 10 shows an example of two such sections, PS1 and PS2, forming a chevron, with the PS2 field at an opposite downtrack phase from PS1, offset by $\pi$, or half a cycle. For visual convenience, only one cycle of each section is shown in FIG. 10.

Figure 11:
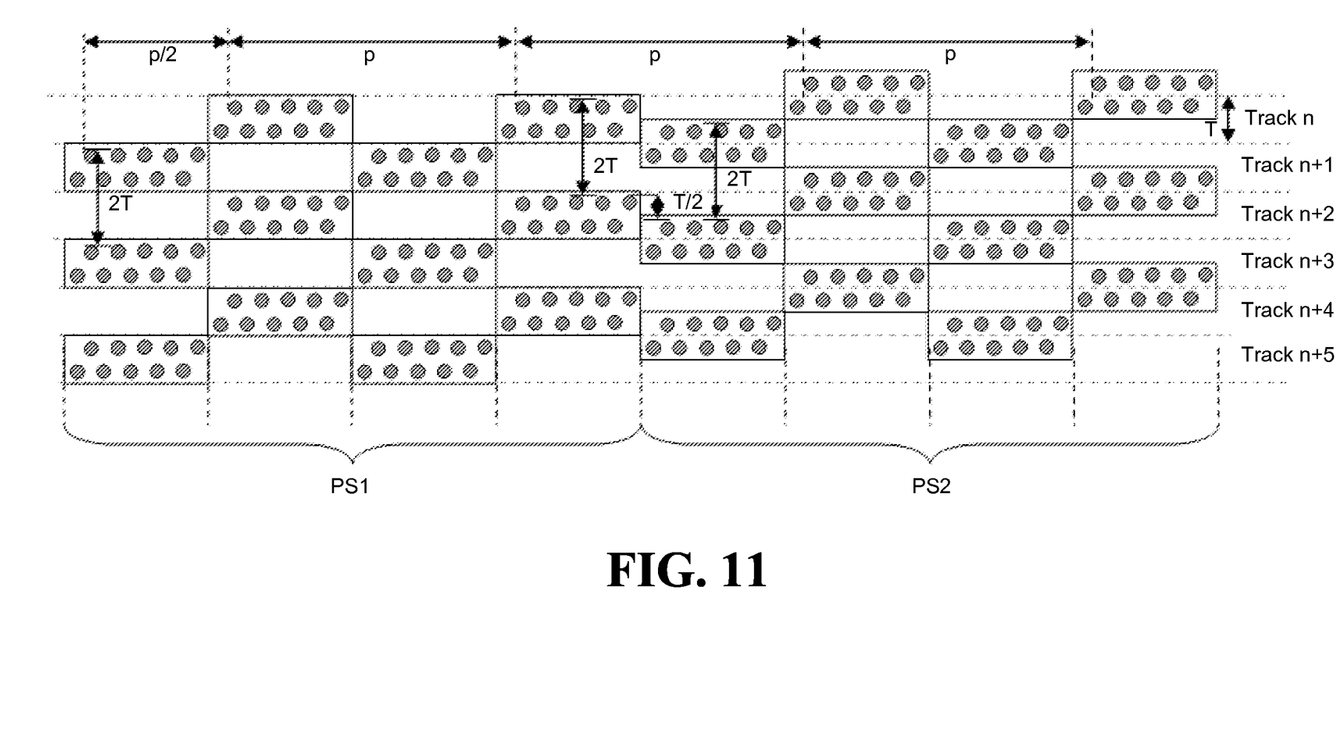
FIG. 11 is another diagram of an illustrative embodiment of dot composite formations of a disc data storage medium having servo and data pattern formations using bit patterned media.

FIG. 11 depicts another diagram of an illustrative embodiment of dot composite formations of a disc data storage medium having servo and data pattern formations using bit patterned media, and more specifically depicts an example embodiment of a null burst pattern. The example pattern consists of two sections, PS1 and PS2. Both have the same down track period, p and the same cross track period equal to track width (T). For PS1, the placement of the dot-composites (illustrated by each rectangle or "servo burst" within which the dots are arranged with a triangular or hexagonal pattern of self-ordered dots) are centered along the center of each track with down track periodicity of p, and is offset by half a period (p/2) with respect to the adjacent tracks. The PS2 pattern in the example embodiment is identical to the PS1 pattern, but is offset with respect to the PS1 pattern in the cross track direction by half a track (T/2) so that each dot-composite is centered along the edge of a track. The down track period, p may have a well-defined relationship with the preamble period (e.g., p can be defined as twice the preamble period) and the crosstrack period of both PS1 and PS2 patterns is two tracks (2T).

A data storage medium with the servo and data field patterns described herein may be fabricated using self-assembly processes using guiding patterns or directly mastered. Guiding patterns may be set at the time of manufacture of the storage medium, and provide trenches or troughs for the self-assembly material.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a data storage medium including:
a first patterned array of dots of magnetic material having a first pattern orientation;
a second patterned array of dots of magnetic material having a second pattern orientation;
a first area including the first patterned array, a third patterned array of dots of magnetic material, and a non-magnetic space located between the first patterned array and third patterned array, the non-magnetic space is larger than a distance between adjacent dots of magnetic material of the first patterned array; and
a second area including the second patterned array.

2. The apparatus of claim 1 further comprising:
a processor configured to store data to a data storage medium; and
the data storage medium is a disc data storage medium.

3. The apparatus of claim 1 further comprising:
the first patterned array and the third patterned array including dot composites, a dot composite including a two-dimensional array in the form of a radial stripe of one or more rows of magnetic dots; and
the non-magnetic space including a radial stripe of non-magnetic material.

4. The apparatus of claim 3 further comprising:
a bit is defined by a combination of the dot composite and the non-magnetic space, an order of which defines the value of each bit.

5. The apparatus of claim 4 further comprising a single larger dot composite used in place of two adjacent dot composites in the series of dot composites and non-magnetic spaces.

6. The apparatus of claim 5 further comprising the single larger dot composite has fewer rows of dots than two dot composites.

7. The apparatus of claim 3 further comprising a dot composite including an odd number of rows of magnetic dots.

8. The apparatus of claim 3 further comprising:
a servo data area including dot composites;
a user data area including a patterned array of dots of magnetic material; and
a frequency of dot composites in the servo data area is based on a distance between dots of magnetic material in the user data area.

9. The apparatus of claim 1 further comprising:
the data storage medium having thereon a servo burst pattern including multiple servo bursts, each of the multiple servo bursts including a two-dimensional array of magnetic dots, each magnetic dot capable of holding a distinct magnetic charge.

10. The apparatus of claim 4 further comprising:
a series of the combinations define values for a sequence of bits.

11. An apparatus comprising:
a data storage medium including:
a first patterned array of dots of magnetic material having a first pattern orientation, the first pattern orientation having dots of magnetic material arranged in vertical rows, with the dots of magnetic material in a first row offset in a cross track direction from the dots of magnetic material in a first adjacent row; and
a second patterned array of dots of magnetic material having a second pattern orientation, the second pattern orientation having dots of magnetic material arranged in horizontal rows, with the dots of magnetic material in a second row offset in a down track direction from the dots of magnetic material in a second adjacent row.

12. An apparatus comprising:
a data storage medium including:
a first patterned array of dots of magnetic material having a first pattern orientation; and
a second patterned array of dots of magnetic material having a second pattern orientation; and
the dots of magnetic material in the first patterned array and the second patterned array arranged in a hexagonal pattern, the hexagonal pattern including six dots of magnetic materials oriented as vertices and a seventh dot of magnetic material located in the center of the hexagonal pattern and located an equal distance from each of the vertices.

13. A system comprising:
a processor configured to store data to a data storage medium;
the data storage medium including:
a first dot composite including a first patterned array of dots of magnetic material and having a first pattern orientation for the dots of magnetic material;
a second dot composite including a second patterned array of dots of magnetic material and having a second pattern orientation for the dots of magnetic material;
the first dot composite and a third dot composite including a third patterned array of dots of magnetic material include two-dimensional arrays in the form of a radial stripe of one or more rows of magnetic dots; and
a non-magnetic space located between the first dot composite and third dot composite, the non-magnetic space including a radial stripe of non-magnetic material.

14. The system of claim 13, the data storage medium further comprising:
the first pattern orientation having dots of magnetic material arranged in vertical rows, with the dots of magnetic material in a first row offset in a cross track direction from the dots of magnetic material in a first adjacent row; and
the second pattern orientation having dots of magnetic material arranged in horizontal rows, with the dots of magnetic material in a second row offset in a down track direction from the dots of magnetic material in a second adjacent row.

15. The system of claim 13, the data storage medium further comprising:
a third patterned array of magnetic dots having a third pattern orientation, the third patterned array including a burst pattern field of a servo data area.

16. The system of claim 13, the data storage medium further comprising the dots of magnetic material in the first dot composite and the second dot composite arranged in a hexagonal pattern, the hexagonal pattern including six dots of magnetic materials oriented as vertices and a seventh dot of magnetic material located in the center of the hexagonal pattern and located an equal distance from each of the vertices.

17. The system of claim 13 further comprising a series of dot composites and non-magnetic spaces defining values for a sequence of bits, the series of dot composites and non-magnetic spaces comprising a data preamble field used for phase and frequency acquisition, for writing data to a data field.

18. The system of claim 13 further comprising an order in which a dot composite and a non-magnetic space occur defining the value of one bit.

* * * * *